US008376307B2

(12) United States Patent
Frolov

(10) Patent No.: US 8,376,307 B2
(45) Date of Patent: Feb. 19, 2013

(54) FOLDABLE STAND FOR A PORTABLE POWER TOOL

(75) Inventor: Andrew Frolov, Glenview, IL (US)

(73) Assignee: Robert Bosch GmbH, Stuttgart (DE)

( * ) Notice: Subject to any disclaimer, the term of this patent is extended or adjusted under 35 U.S.C. 154(b) by 308 days.

(21) Appl. No.: 12/793,275

(22) Filed: Jun. 3, 2010

(65) Prior Publication Data

US 2011/0297799 A1 Dec. 8, 2011

(51) Int. Cl.
*F16M 11/38* (2006.01)

(52) U.S. Cl. ...................... 248/431; 248/440.1; 108/118

(58) Field of Classification Search .................. 248/164, 248/166, 431, 432, 436, 440.1, 176.1, 316.1, 248/316.5, 510, 673; 108/118, 120, 170, 108/175

See application file for complete search history.

(56) References Cited

U.S. PATENT DOCUMENTS 1,166,865 A * 1/1916 Stone ............................ 248/673
5,320,150 A * 6/1994 Everts et al. .................. 144/287
6,546,978 B2 4/2003 Thoman
6,607,015 B1 8/2003 Chen
D486,504 S 2/2004 Huang
6,899,306 B1 5/2005 Huang
7,055,847 B2 * 6/2006 Miller et al. .................. 280/638
7,222,865 B2 * 5/2007 Chen et al. ...................... 280/30
7,240,705 B2 7/2007 Alger
D550,476 S 9/2007 Liu et al.
2004/0025759 A1 * 2/2004 Lee .............................. 108/118
2005/0072493 A1 4/2005 Velasco
2005/0199768 A1 9/2005 Tam et al.
2007/0102892 A1 5/2007 Chiu
2009/0241811 A1 * 10/2009 Markegard et al. ........... 108/118

OTHER PUBLICATIONS

PCT International Search Report issued in corresponding PCT Application No. PCT/US2011/038146 on Aug. 22, 2011.

* cited by examiner

*Primary Examiner* — Gwendolyn Baxter
(74) *Attorney, Agent, or Firm* — Maginot, Moore & Beck

(57) ABSTRACT

A foldable stand for supporting an object, the stand being capable of being folded between an unfolded position and a thin flat folded position, comprising a top frame having a generally rectangular planar configuration with front and rear support members interconnected with left and right spaced apart side support members, each of the side support members having a hinge generally midway along the length thereof, permitting the top frame to be folded when the stand is in the folded position, a pair of foldable leg structures, one of which is attached to each side of the top frame for supporting the top frame, a retaining structure for engaging the object and a locking mechanism for engaging the object, wherein manipulation of the top frame to rotate the hinge between the folded and unfolded positions causes each of the leg structures to be correspondingly moved between folded and unfolded positions.

19 Claims, 9 Drawing Sheets

FOLDABLE STAND FOR A PORTABLE POWER TOOL

BACKGROUND OF THE INVENTION

The present invention generally relates to foldable portable stands for supporting an object.

Many journeymen in the construction and maintenance trades utilize power tools that they supply and therefore often need to transport to and from jobsites to assure that they will not be stolen if left overnight. A common tool that is used in this way is a portable table saw. Modern portable table saws are becoming more lightweight without sacrificing strength and durability as well as accuracy in their use. It is often desirable, if not necessary, to have a stand for supporting the table saws at a convenient working elevation for the journeymen. It is for these reasons that there has been a continuing effort in the design and configuration of stands for such portable tools that are reasonably priced, strong and durable, stable and easily set up and taken down. Many designs are fabricated from a large number of parts, which results in a stand that is unwieldy to setup and take down. When broken down, they are often required to be at least partially disassembled in multiple steps, all of which contributes to inconvenience and inefficient use on many levels.

SUMMARY OF THE INVENTION

Embodiments of the present invention are directed to a foldable stand for supporting an object having a generally planar footprint in contact therewith, the stand being capable of being folded between an unfolded object supporting position and a thin flat folded position, comprising a top frame having a generally rectangular planar configuration with front and rear support members interconnected with left and right spaced apart side support members, each of the side support members having a hinge generally midway along the length thereof, permitting the top frame to be folded so that the front and rear support members are in near contact relation when the stand is in the folded position, a pair of foldable leg structures, one of which is attached to each side of the top frame for supporting the top frame and the object at an elevation above a ground surface, a retaining structure attached to one of the front and rear support members for engaging a portion of the object adjacent the frame in contact with the stand, and a locking mechanism attached to the other of the front and rear support members for engaging another portion of the object adjacent to the frame in contact with the, wherein manipulation of the top frame to rotate the hinge between the folded and unfolded positions causes each of the leg structures to be correspondingly moved between folded and unfolded positions.

DETAILED DESCRIPTION

An advantage of the embodiments of the stand embodying the present invention is that there are no sliding parts in the stand that can be inconvenient to manipulate. Moreover, there are no bolts that need to be tightened or loosened during setup or breakdown of the stand. All that is required is the manipulation of the stand so that parts generally simultaneously pivot around eight different pivot points, three of which are provided on each leg structure and a single hinge on each side support member.

Another advantage of the stand embodying the present invention is that a journeyman needs only to take the folded stand to a jobsite, unlock a transport locking mechanism if the embodiment has one, and then the journeymen needs only to unfold the top frame which involves unfolding the split portions of the left and right support members which then automatically causes the leg structures to unfold. When the top frame is flat, it is ready to use, and is therefore ready to have an object such as the table saw mounted on the top frame. These few steps require only a few minutes to accomplish and are done without any tools.

Figure 1:
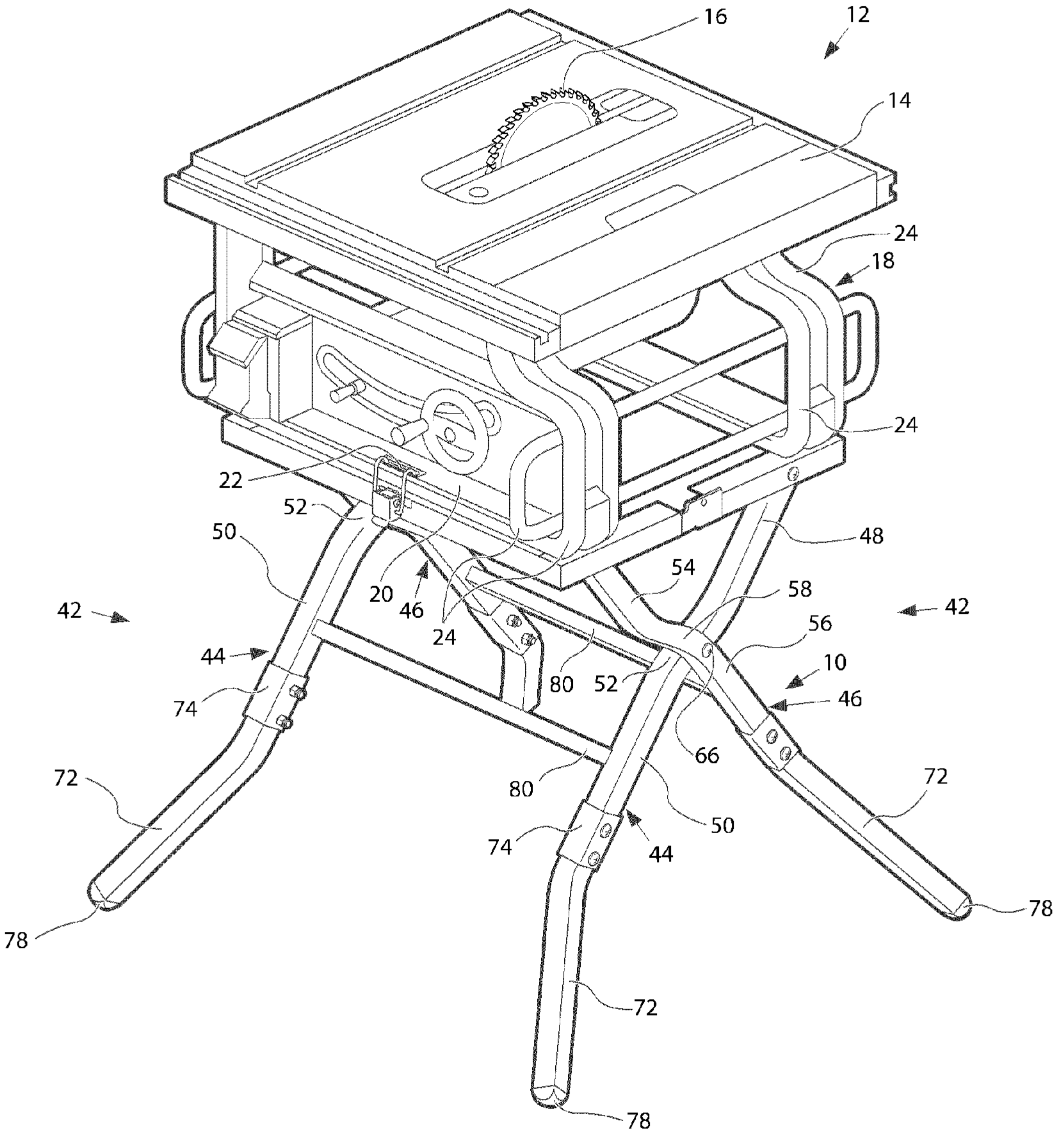
FIG. 1 is a right front perspective view of a foldable stand embodying the present invention shown together with an object in the form of a portable table saw that is attached to the stand.

Turning now to the drawings, and particularly FIG. 1, a preferred embodiment of a portable stand is indicated generally at 10 and is shown with an object, indicated generally at 12, mounted thereon, with the object 12 being a portable table saw of the type that is used in construction and other endeavors and is generally transported to a jobsite for use. The saw is desirably mounted on a support surface, which with the foldable stand of the present invention is conveniently configured to be easily transported and quickly set up for use.

The desirable features of the foldable stand include its stability and strength and ease with which it can be unfolded from the transport position into an unfolded usable position. As will be described, it is only necessary to manipulate, i.e., unfold, a foldable top frame and the carrying out of that action automatically unfolds the leg structures. These actions are accomplished by manipulation of the table top frame which merely causes several pivot connections to be simultaneously rotated.

While the object 12 is not in and of itself a part of the present invention, the stand 10 is designed to conveniently have an object mounted on it, such as the portable saw shown in FIG. 1 which has a top 14, a blade 16, a base frame, indicated generally at 18, which includes a front frame portion 20 that includes a recess 22. While the front frame portion 20 is relatively flat, the frame portion also has several structural components such as those identified at 24, which are preferably made of tubular steel or aluminum profile. The rear surface of the object 12, while not specifically shown is comprised of a length of such tubular steel or aluminum profile that presents a surface for attachment to the stand 10.

Figure 2:
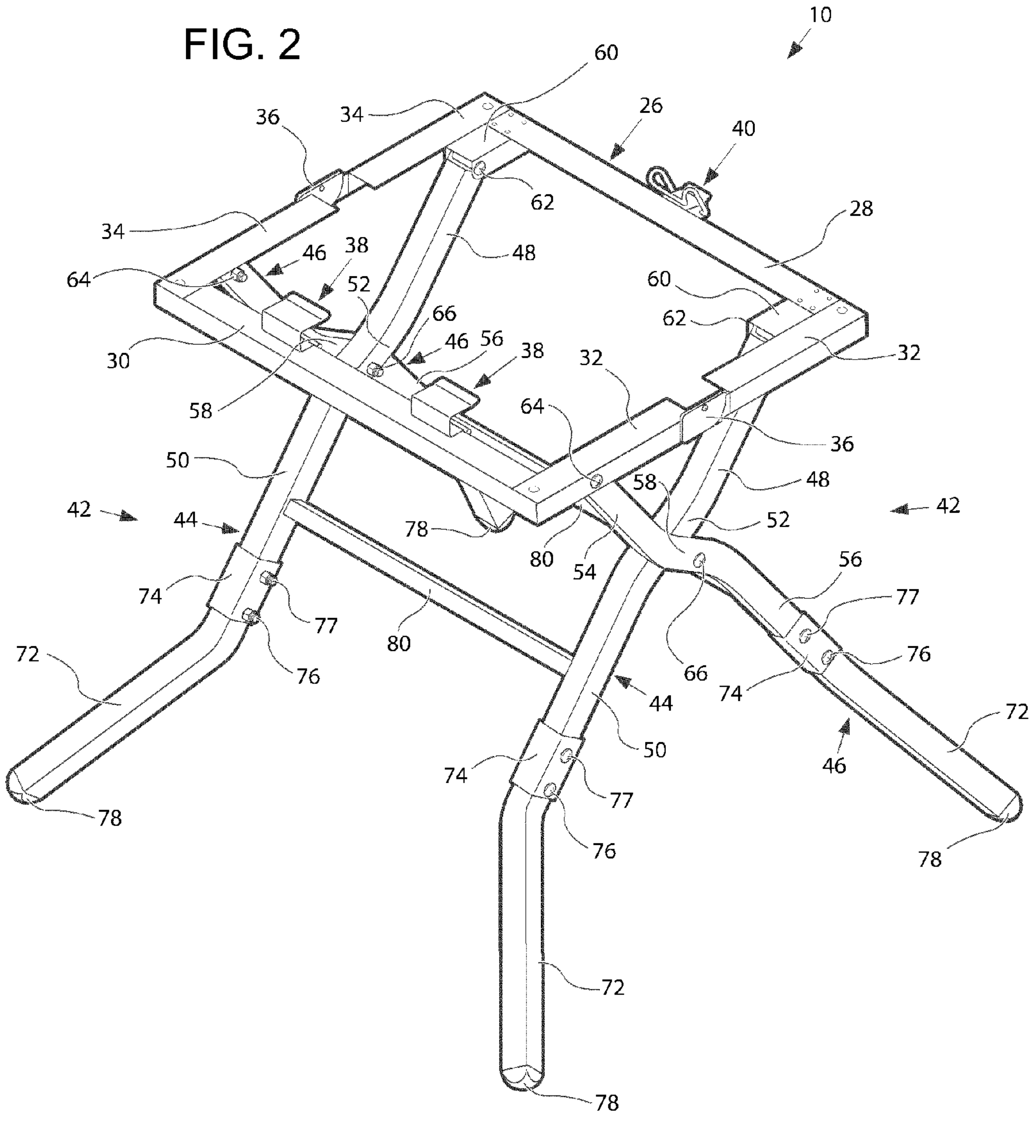
FIG. 2 is a left rear perspective of a preferred embodiment of a foldable stand shown in FIG. 1.

Turning now to FIG. 2, the foldable stand 10 includes a top frame, indicated generally at 26, which is comprised of a front support member 28, a rear support member 30, a left support member 32 and a right support member 34. The four support members define a generally square planar configuration, although it may be a rectangular configuration depending upon the footprint of the object 12 in which it is intended to support. The top horizontal surfaces define a plane for supporting the object 12 and each of the support members is preferably made of a right angle metal such as steel or aluminum sized to provide a strong stable support surface for supporting the object at an elevation above ground level which is defined by a plane passing through the bottom of the four legs shown in FIG. 1, for example.

Figure 3:
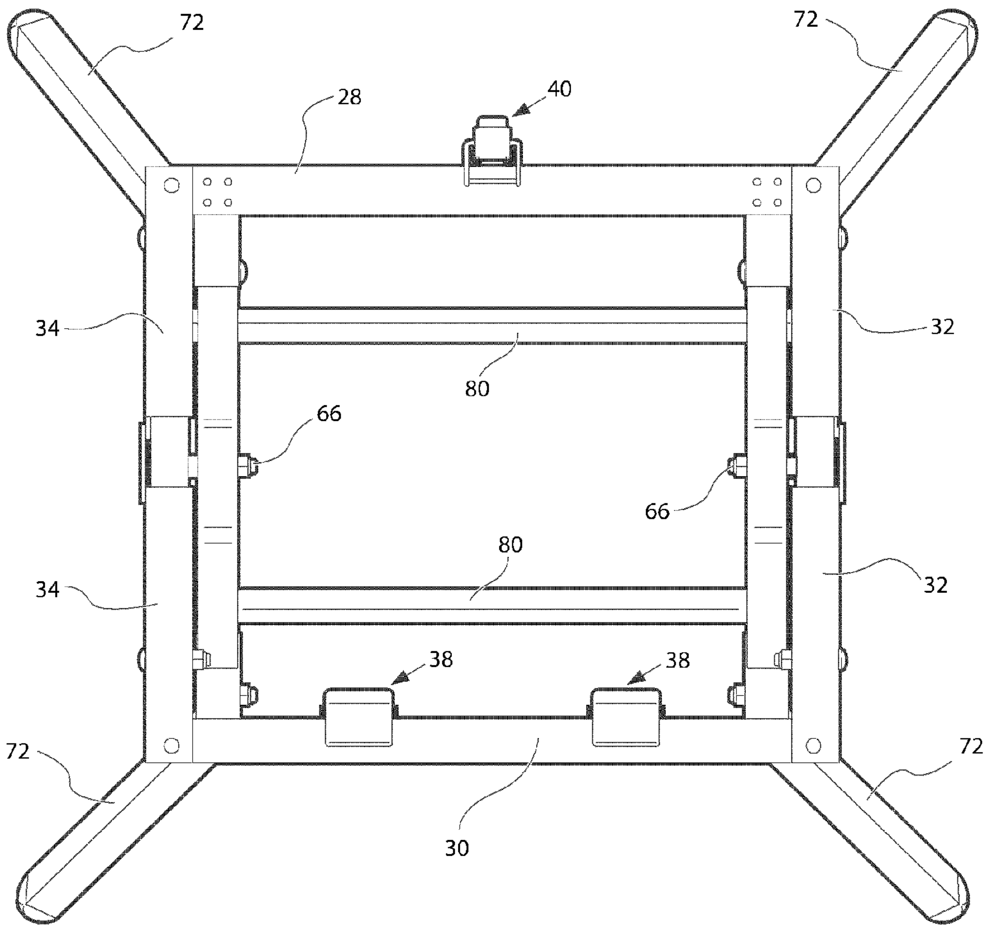
FIG. 3 is a top view of the stand shown in FIG. 2 showing the rear portion at the bottom of the view.
Figure 10:
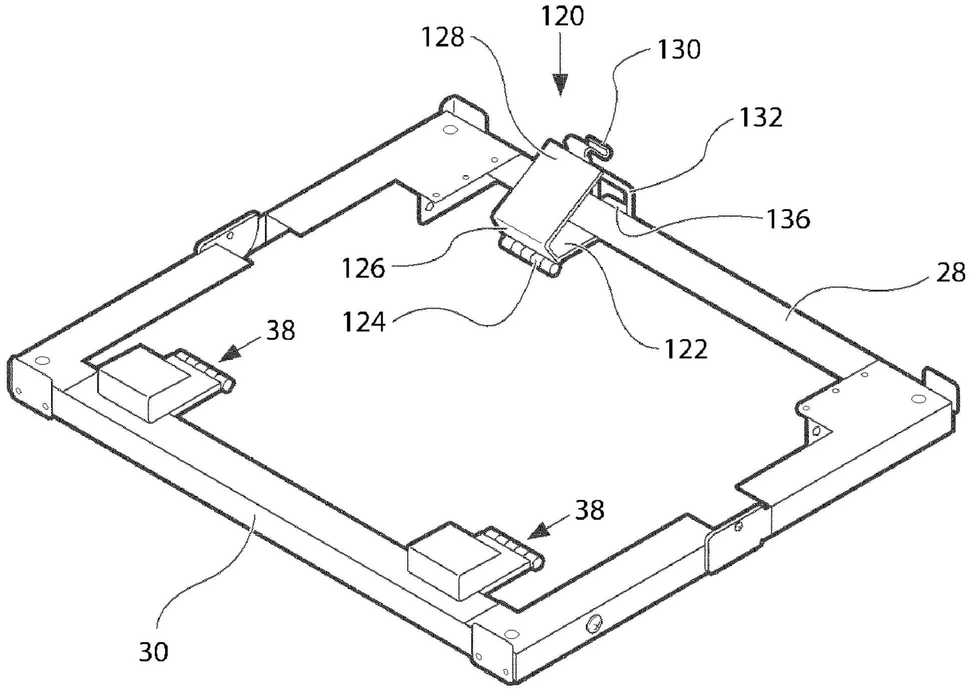
FIG. 10 is a left rear perspective of the top frame portion of the portable stand shown in FIG. 1 and illustrating the retaining mechanism and a transport locking mechanism.

It is noted that the support members are attached to adjacent support members at the junction of them and while various ways are possible for attaching these members together as shown, it is preferred that they be secured by permanent weldments and preferably by spot welding, which is indicated by small circles at the corners where there are overlying end portions, particularly in FIGS. 2, 3, and 10. Each of the left and right side support members 32, 34 have a hinge 36 midway along their length, and a cut out gap in the top surface is provided adjacent the hinge 36 to prevent any interference during pivoting movement of the sides 32 and 34. In this regard, the hinge 36 is configured to have the split side members 32 and 34 rotate with the hinge 36 moving downwardly as shown in FIG. 2 so that the top surfaces of the split side member 32 and 34 can be folded into an abutting or near abutting relation when the stand is folded for transport. It is shown in its unfolded position in FIG. 2 which is ready to receive an object 12 that is to be mounted to the stand 10.

To mount an object on the stand 10, a retaining structure is provided in the form of a pair of spaced apart hooks, indicated generally at 38, which are preferably mounted to the rear support member 30 and the stand also has a locking mechanism, indicated generally at 40, that is mounted to the front support member 28. The retaining structure 38 and locking mechanism 40 are configured to receive an object 12 wherein the rear portion of the object is inserted into the retaining structure 38 and the locking mechanism is then secured to a front surface of the object to firmly hold the object to the frame 10.

It should be understood that the bottom of the object 12 is preferably flat and rests on the top surfaces of the four support members which are preferably sized to accept the footprint of the object. With the front and back of the object 12 being firmly held in place, and with at least a significant portion of the weight of the object resting on the front and rear support members, there is no appreciable resulting forces being applied to pivot the left and right side members 34 about the hinge 36.

Figure 5:
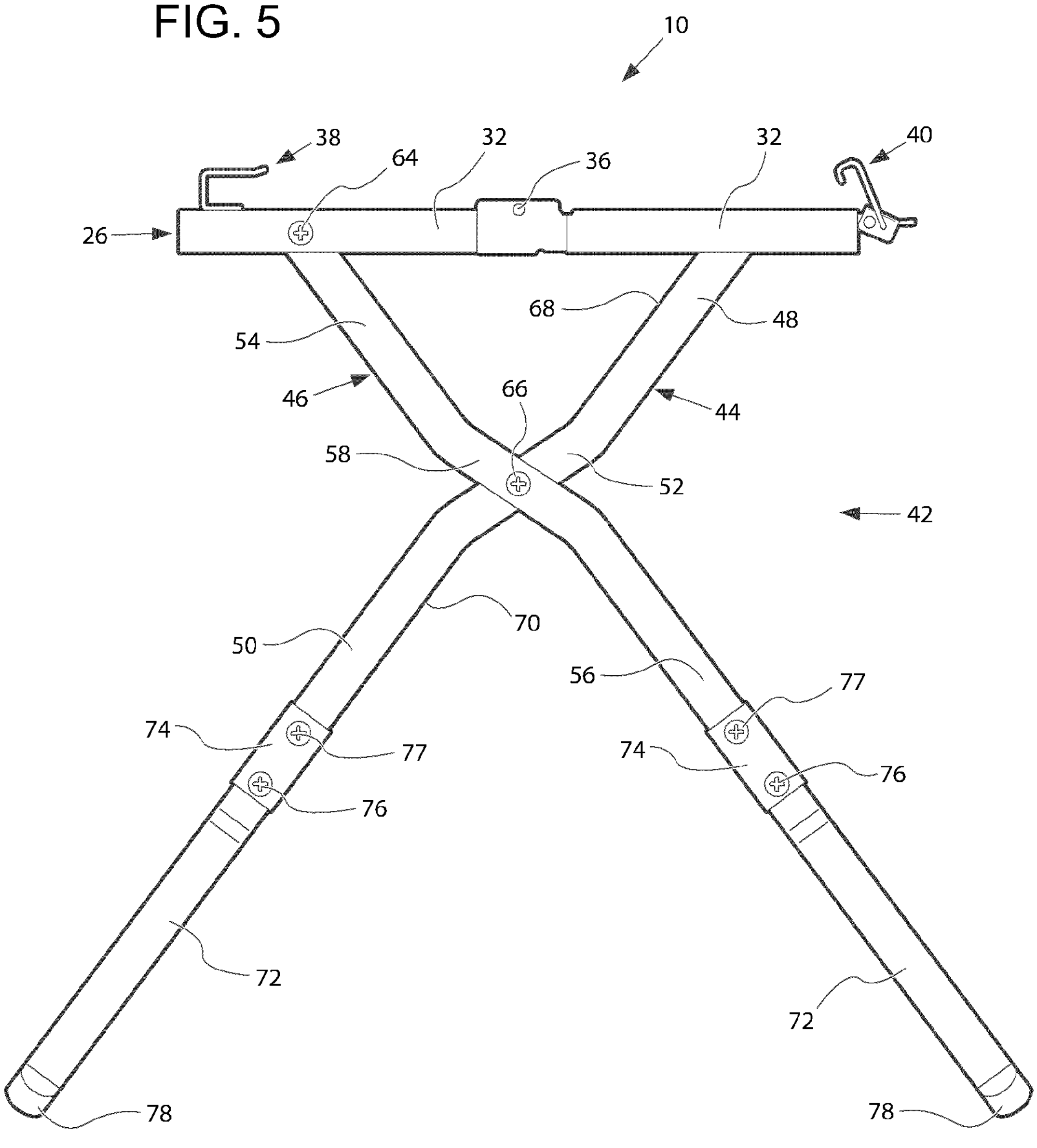
FIG. 5 is a left side view of the stand shown in FIG. 2.

To support the top frame 26, a pair of foldable leg structures, indicated generally at 42, are provided with one of the leg structures being connected to or closely adjacent to each of the left and right frame support members 32 and 34. As best shown in FIGS. 2, 3 and 5, the leg structures have a pair of elongated legs, indicated generally at 44 and 46, with leg 44 having an upper end portion 48, a lower portion 50 and an angled middle portion 52. Similarly, the leg 46 has an upper end portion 54, a lower end portion 56 and an angled middle portion 58.

As best shown in FIG. 2, the upper end portions 48 of the legs 44 are connected to a mounting bracket 60 that is attached to the front support member 28 and extends inwardly away from the front support member 28 by a distance that is determined to provide the top frame at a level elevation when the stand 10 unfolded. At the outer end of the bracket 60 is a pivot connection comprised of a bolt 62 for pivotably mounting the leg to the top frame 26. The bracket 60 is preferably attached to the underside of the top surface of the front support member 28 by spot welding or other welding, although it may be bolted or otherwise mechanically attached if desired. The upper end portion 54 of the legs 46 is also attached to the top frame and particularly has a pivot connection 64 preferably comprised of a bolt that extends through the sides of the left support members 32 and 34.

Figure 13:
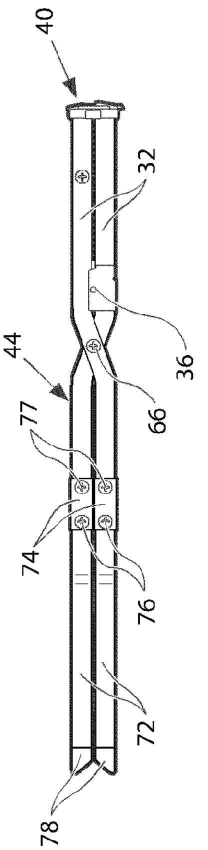
FIG. 13 is a side view of the stand shown in FIG. 12 in its folded position.
Figure 14:
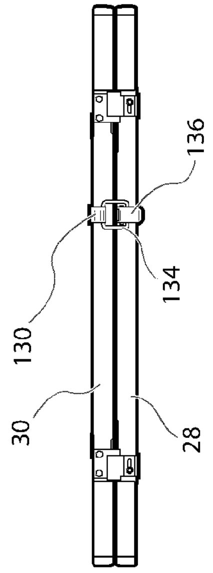
FIG. 14 is an end view of the stand shown in FIGS. 12 and 13 in its folded position.

The middle portions 52 and 58 of the legs 44 and 46 have a pivot connection 66 for interconnecting them in the form of a bolt that extends through suitable openings in both of these middle portions. The length of the middle portions as well as the angular offset of them is chosen so that when the stand 10 is folded, the upper end portions 48 and 54 as well as the lower end portions 50 and 56 will be closely adjacent one another as shown in FIGS. 13 and 14, for example. Thus, as shown in FIG. 5, the left surface 68 is generally aligned with the rightward surface at 70 of the lower end portion 50.

The leg structures 44 and 46 are preferably made of a hollow rectangular or square tube or extrusion stock of either steel or aluminum sufficiently sized to support the object in which it is intended to accompany in a stable and durable manner. The leg structures are preferably provided with foot portions 72 that are attached to the bottom ends of the lower end portions 50 and 56 by suitable square sleeves or brackets 74 that are bolted to the foot portions 72 by bolts 76 or the like. The sleeves 74 may be permanently attached to the lower end portions 50 and 56 by bolts 77 or may be welded thereto if desired. It is preferable that the foot portions 72 be removable so that they can be broken down to produce a smaller overall stand package for initial sale and shipment.

Figure 4:
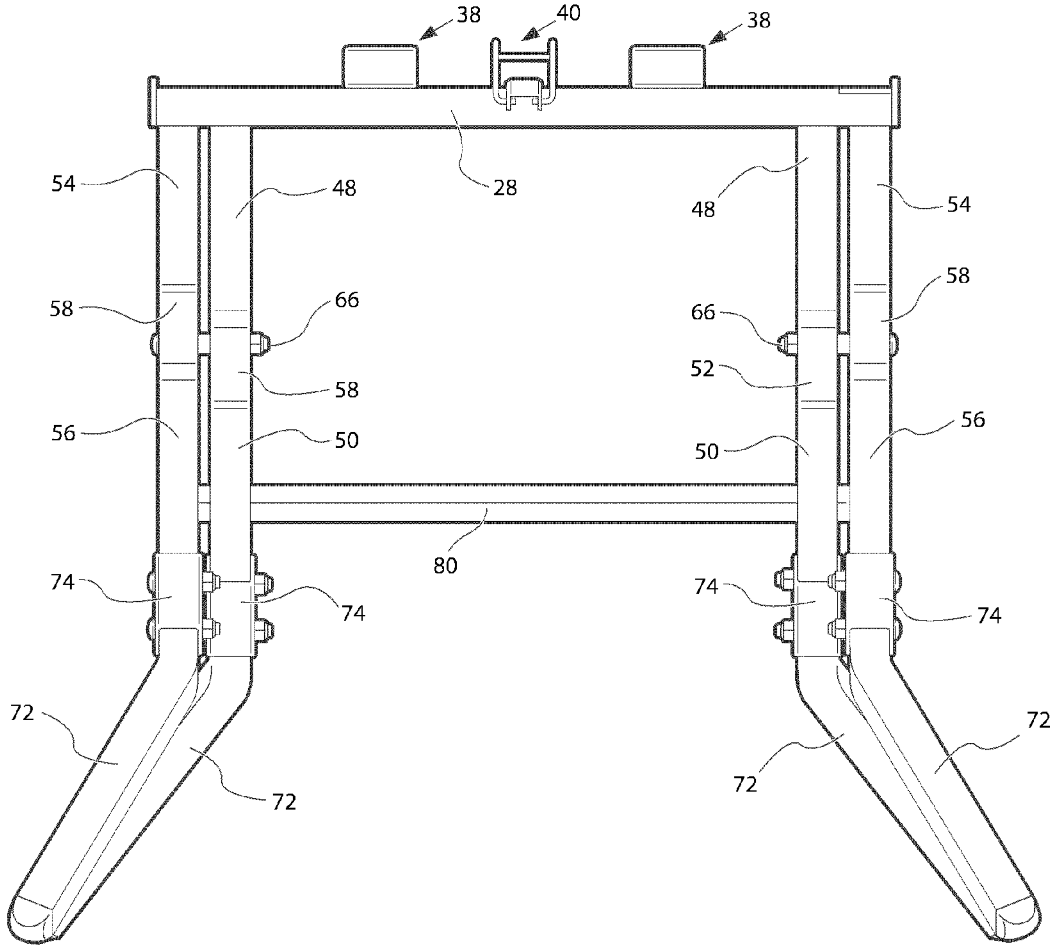
FIG. 4 is a front view of the stand shown in FIG. 2.

The foot portions 72 are preferably angled outwardly as best shown in FIGS. 2, 3 and 4. However, as shown in FIG. 5, the angle is such that the foot portions remain aligned in the same plane as the general alignment of the lower foot portions foot portions 50 and 56 so that they can be conveniently folded into a relatively thin configuration as shown in FIGS. 13 and 14, which is essentially the thickness of two legs 44, 46.

Figure 12:
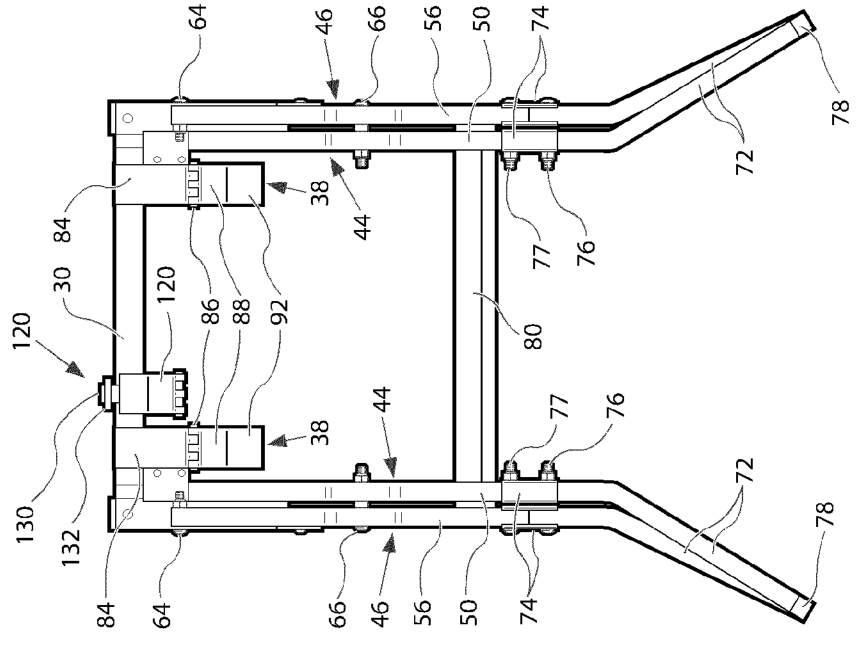
FIG. 12 is a front bottom view of the embodiment shown in FIG. 2, illustrating the stand in a folded position.

The angle of the foot portion 72 that is attached to the lower portions 50 of the legs 44 and 46 is angled slightly more than the foot extensions 72 that are attached to the lower end portions 56 of the legs 46. This results in the ends, including the inserts 78 being generally aligned in the direction from front to rear so that the stability of the stand is assured. Also as shown in FIG. 12, with the ends of the foot portion 72 being aligned, they will be closely adjacent one another if not in contact with one another in the folded position as shown in FIGS. 13 and 14.

The bottom of the foot portions 72 may preferably have a closed end provided by an insert 78 that is force fit into the opening. As shown in FIG. 2, a pair of cross braces 80 are provided between the two leg structures 42 which interconnect the lower end portions 50 and 56 to provide additional stability for the stand 10.

Figure 9:
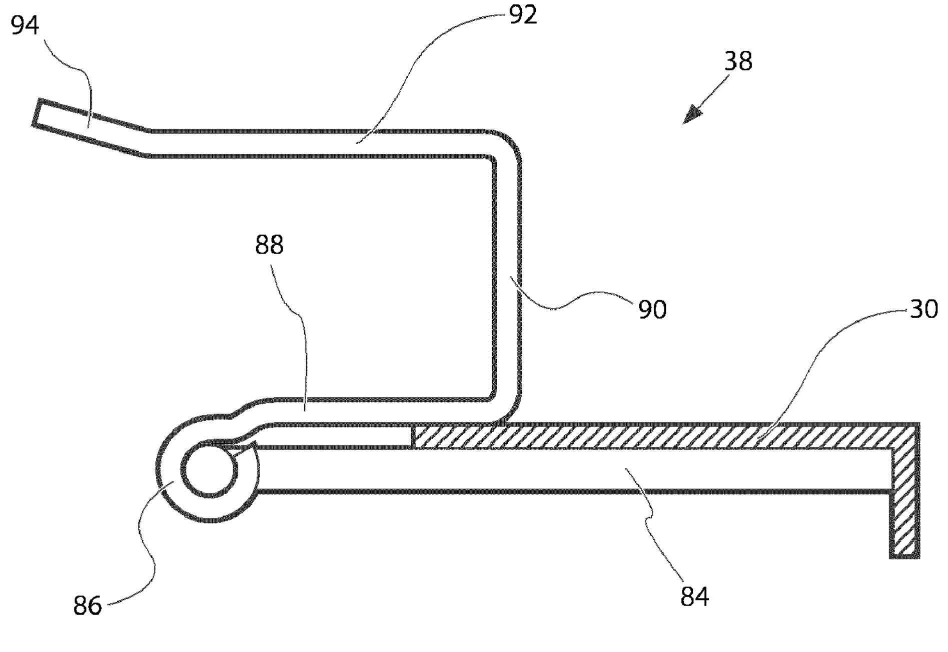
FIG. 9 is a side view of a portion of a retaining mechanism of the embodiment shown in FIG. 2.

Turning now to the retaining structure hooks 38 and FIGS. 5, 9-12, the hooks 38 have a base portion 84 that is connected to a hinge 86 that in turn is connected to a base extension 88 that merges with a transverse portion 90 that in turn merges with a return portion 92 having an outwardly flared end 94 to more easily guide a cooperating surface of an object that is being inserted into the opening defined by the portions 88, 90 and 92. As best shown in FIG. 9, there is a gap between the upper surface of the base portion 84 and the lower surface of the base extension 88 which is preferably sized to accommodate the thickness of the horizontal portion of the rear support member 30.

When the hook 38 is in position to have an object mounted to the stand 10, it will be in the position shown in FIG. 9 as well as 5, 10 and 11. The base extension 88 generally overlies the base portion 84 when it is in position to receive a surface of the object 12 and the hinge 86 enables the part above the surface of the top frame 26 of the rear support member 30 to receive the object. When it is desired to place the stand 10 in a folded position, the upper part of the hook 38 can be rotated about the hinge 86 so that it does not protrude beyond the top surface of the top frame 26 which is the top surface of the rear support member 30 as shown in FIG. 9.

Turning now to the locking system and referring to the preferred embodiment shown in FIGS. 2, 5, 6 and 7, the locking mechanism 40 has a pivot plate 100 that is attached to the vertical side surface of the front support member 28. It has a pair of spaced apart sides 102 extending from the portion contacting the front support member 28, and both have openings for receiving a bolt 104 defining a pivot connection 106 and is shown to have a C-clip for maintaining the pivot connection. A handle 108 is pivotably connected to the pivot connection 106 and it also has a clamp bracket 110 pivotably connected at its lower end 112 that extends upwardly from both sides of the handle 108 and it has an outer clamping end 114, with the two sides being connected together by a mid-portion 116.

Figure 7:
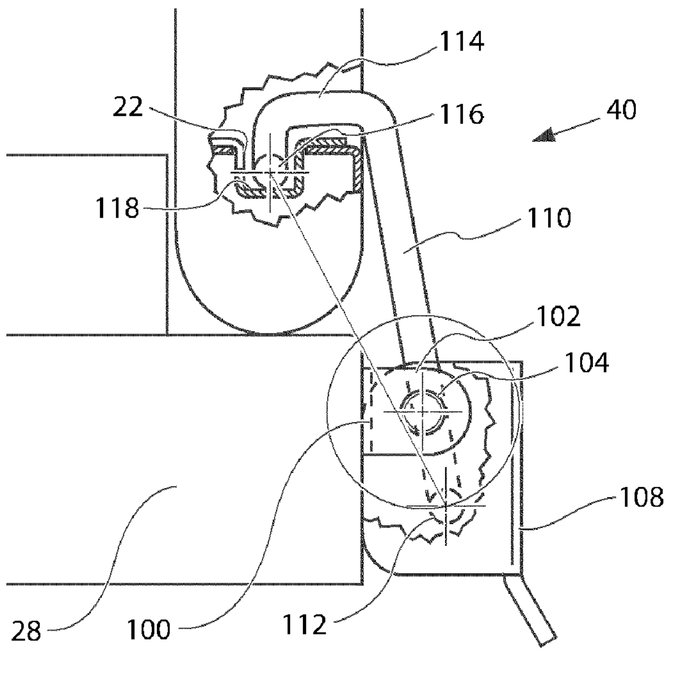
FIG. 7 is a side view, with portions removed, showing the locking mechanism portion shown in FIG. 6.

As shown in FIG. 7, the clamping portion 114 has a general U-shape configuration as viewed from either side, with the mid-portion 116 engaging a bottom surface 118 at the recess 22 of the object 12. As is also shown in the side view of FIG. 7, the lower end 112 of the clamp bracket 110 is located below the pivot connection 106 and is spaced apart from it by a small distance. The pivot connection 106 is located to the right of a straight line extending between the mid portion 116 of the clamping end 114 and the lower end 112 of the clamp bracket 110.

The clamp bracket 110 is preferably bent from a spring steel wire and has resilience. The positioning of the contact point defined by the mid-portion 116 of the clamping end 114 relative to the pivot connection 106 in the manner described above creates or defines an over-center locking mechanism so that when the handle 108 is placed in the position shown in FIG. 7, the locking mechanism 40 will be retained in a locked position if and until a user pulls the handle 108 in a counter-clockwise direction around the pivot connection 106 to release the locking mechanism.

Figure 6:
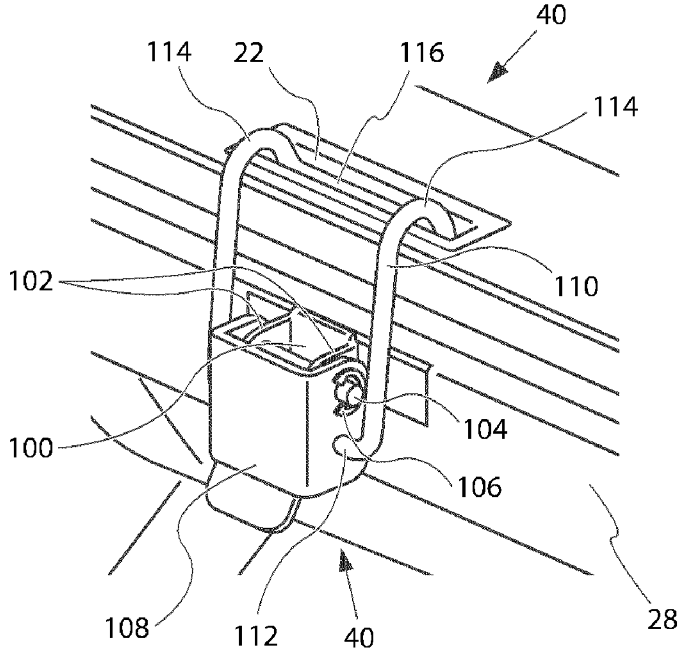
FIG. 6 is an enlarged perspective view of a locking mechanism portion of the stand shown in FIG. 2.
Figure 8:
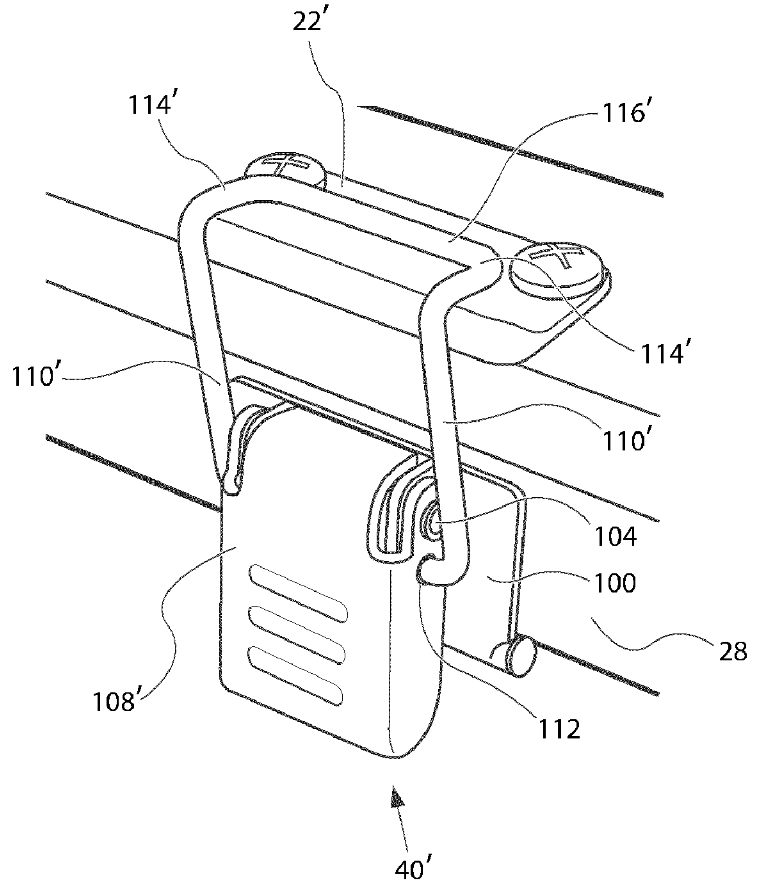
FIG. 8 is an alternate embodiment of a locking mechanism portion.

An alternative embodiment of a locking mechanism is shown in FIG. 8 where the members have been given a prime designation where they differ slightly from the embodiment shown in FIGS. 6 and 7. The principal difference between the two embodiments is that the embodiment shown in FIG. 8 has a generally L-shaped outer clamping end 114' which engages a recess 22' which is much more shallow than the recess 22 shown in FIGS. 6 and 7.

Figure 11:
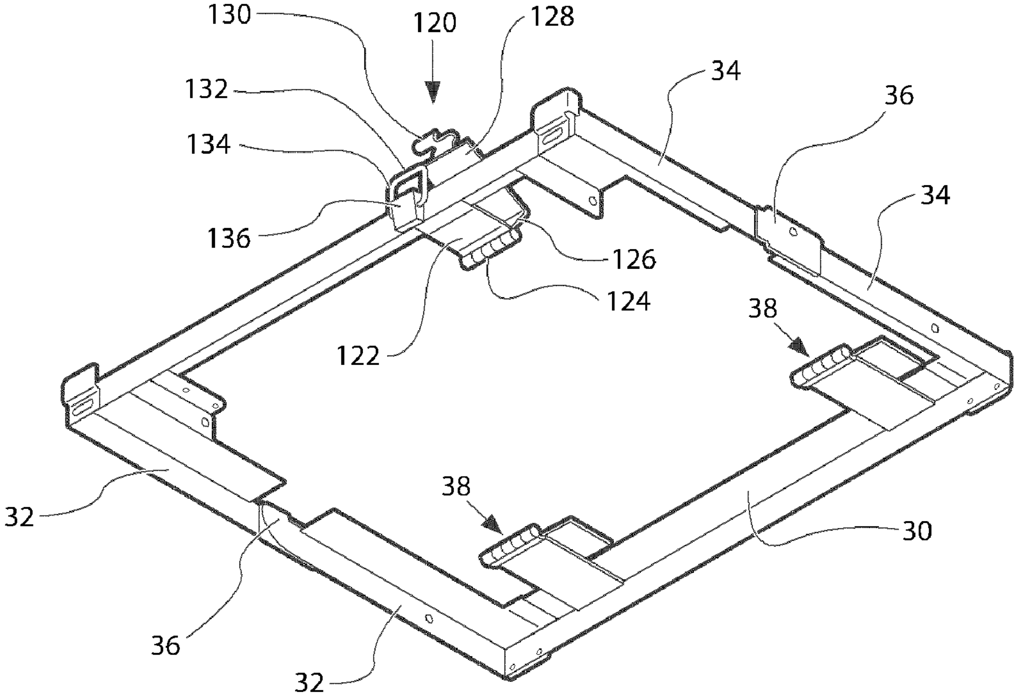
FIG. 11 is a perspective view illustrating the underside of the top frame shown in FIG. 10.

Another embodiment of the present invention includes a locking mechanism for transporting the folded stand to and from a jobsite, for example, and referring to FIGS. 10, 11 and 12. It is shown at 120. It is configured to enclose both front and rear support members 28 and 30 when it is in locked position and it is preferably attached to the front support member similar to the hooks 38, with the locking mechanism having a base portion 122, a hinge 124, a base extension 126, a transverse portion 128 and a catch portion 130 that is configured to receive a clamping end 132 of a clamp bracket 134 that is attached to a handle 136 that is also designed to operate as an over-center locking mechanism as described with regard to the locking mechanism 40.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention.

Various features of the invention are set forth in the following claims.

What is claimed is:

1. A foldable stand for supporting an object having a generally planar footprint in contact therewith, said stand being capable of being folded between an unfolded object supporting position and a thin flat folded position, comprising:

a top frame having a generally rectangular planar configuration with front and rear support members interconnected with left and right spaced apart side support members, each of said side support members having a hinge generally midway along the length thereof, permitting said top frame to be folded so that said front and rear support members are in near contact relation when said stand is in said folded position;

a pair of foldable leg structures, one of which is attached to side of said top frame for supporting said top frame and the object at an elevation above a ground surface;

a retaining structure attached to one of said front and rear support members for engaging a portion of the object adjacent the footprint in contact with the stand; and a locking mechanism attached to the other of said front and rear support members for engaging another portion of the object adjacent the footprint in contact with the stand;

wherein said retaining structure is configured to be provided above a top plane defined by a top portion of said front and rear support members when said stand is in said unfolded position and rotated into a stored position where said retaining structure is positioned below said top plane before said stand is placed in said folded position.

2. A foldable stand as defined in claim 1 wherein said retaining structure comprises a pair of spaced apart hooks mounted to said one support member configured to engage the adjacent portion of the object and hold the same when said locking mechanism is engaged.

3. A foldable stand as defined in claim 2 wherein each of said pair of spaced apart hooks comprises a base portion that is mounted on one of said front and rear support members, a base extension that extends inwardly toward the other of said front and rear support members, a fourth pivot connection between the said base portion and said base extension that permits said extension to overlie said base portion, a transverse portion extending from said base extension and a return portion extending in a direction generally parallel to said base extension toward said hinge.

4. A foldable stand as defined in claim 3 wherein said pair of spaced apart hooks are in engaging position when said base extension overlies said base portion, said transverse and return portions being positioned above said plane defined by an upper surface of said front and rear support members.

5. A foldable stand as defined in claim 4 wherein the distance between said return portion and said base extension generally corresponds to the dimension of an adjacent part of the object that can be inserted into said hooks.

6. A foldable stand as defined in claim 1 wherein said locking mechanism comprises a quick connect, quick release spring action latch system for selectively engaging the another adjacent portion of the object.

7. A foldable stand as defined in claim 6 wherein said front, rear and side support members have said top portion and a downwardly side portion oriented transversely relative to one another with said top portion defining said top plane for supporting the object.

8. A foldable stand as defined in claim 7 wherein said front, rear and side support members have overlapping portions that are attached to adjacent support members.

9. A foldable stand as defined in claim 8 wherein said overlapping portions are attached by weldments.

10. A foldable stand as defined in claim 7 wherein said quick connect, quick release spring action latch system comprises a pivot plate attached to the said side portion of one of said front and rear support members, a handle having a fourth pivot connection to said pivot plate, a clamp bracket extending upwardly and having a fifth pivot connection to said handle, said clamp bracket having an outer clamping end for engaging a clamping surface of the object, said fifth pivot connection being located below and spaced away from said fourth pivot connection to thereby define an over-center clamp locking action.

11. A foldable stand as defined in claim 10 wherein said outer clamping end is one of an L shape or a U shape.

12. A foldable stand as defined in claim 10 wherein said clamp bracket is made of spring steel wire or sheet metal.

13. A foldable stand as defined in claim 1 wherein each of said foldable leg structures further comprises two elongated legs having a first pivot connection between said legs generally midway along their lengths, upper and lower end portions extending from said first pivot connection, said one leg having said upper end having a second pivot connection between said frame generally at the junction of one of said rear and front support members and one of said side support members, said other leg having an upper end third pivot connection between said frame generally at the junction of the other of said rear and front support members and said one of said side support members.

14. A foldable stand as defined in claim 13 wherein said stand is configured to be moved between said folded and unfolded positions by only manipulating said stand to rotate said hinge and said three pivot connections of each of said leg structures.

15. A foldable stand as defined in claim 14 wherein manipulation of said top frame between said folded and unfolded positions by rotating said hinge causes said three pivot connections of each of said leg structures to be rotated between said folded and unfolded positions.

16. A foldable stand as defined in claim 13 wherein said elongated legs are comprised of hollow tubular metal said elongated legs having a short angled portion including and extending from each side of said pivot connection so that the upper and lower end portions of each leg lie in two planes that are generally parallel to one another and offset from one another by a distance generally corresponding to the width of at least one of said tubular metal legs.

17. A foldable stand as defined in claim 16 wherein said lower portion of said legs includes an outwardly flared foot portion, said foot portion being in the same plane as said lower portion.

18. A foldable stand as defined in claim 17 wherein said foot portions are configured to be removed from said lower portion of said legs.

19. A foldable stand for supporting an object having a generally planar footprint in contact therewith, said stand being capable of being folded between an unfolded object supporting position and a thin flat folded position, comprising:

a top frame having a generally rectangular planar configuration with front and rear support members interconnected with left and right spaced apart side support members, each of said side support members having a hinge generally midway along the length thereof, permitting said top frame to be folded so that said front and rear support members are in near contact relation when said stand is in said folded position;

a pair of foldable leg structures, one of which is attached to each side of said top frame for supporting said top frame and the object at an elevation above a ground surface;

a retaining structure attached to one of said front and rear support members for engaging a portion of the object adjacent the footprint in contact with the stand; and a locking mechanism attached to the other of said front and rear support members for engaging another portion of the object adjacent to the footprint in contact with the stand;

wherein manipulation of said top frame to rotate said hinge between said folded and unfolded positions causes each of said leg structures to be correspondingly moved between folded and unfolded positions;

said retaining structure is configured to be provided above a top plane defined by a top portion of said front and rear support members when said stand is in said unfolded position and rotated into a stored position where said retaining structure is positioned below said top plane before said stand is placed in the folded position.

* * * * *